(12) United States Patent
Pateux et al.

(10) Patent No.: US 9,106,910 B2
(45) Date of Patent: Aug. 11, 2015

(54) METHOD OF CODING AND DECODING IMAGES, CORRESPONDING DEVICE FOR CODING AND DECODING AND COMPUTER PROGRAM

(75) Inventors: Stéphane Pateux, Rennes (FR); Nathalie Cammas, Sens de Bretagne (FR); Isabelle Amonou, Cesson-Sevigne (FR)

(73) Assignee: ORANGE, Paris (FR)

(*) Notice: Subject to any disclaimer, the term of this patent is extended or adjusted under 35 U.S.C. 154(b) by 535 days.

(21) Appl. No.: 13/380,632

(22) PCT Filed: Jun. 21, 2010

(86) PCT No.: PCT/FR2010/051248
§ 371 (c)(1),
(2), (4) Date: Feb. 21, 2012

(87) PCT Pub. No.: WO2010/149914
PCT Pub. Date: Dec. 29, 2010

(65) Prior Publication Data
US 2012/0183070 A1 Jul. 19, 2012

(30) Foreign Application Priority Data
Jun. 23, 2009 (FR) ...................................... 09 54290

(51) Int. Cl.
*H04N 7/32* (2006.01)
*H04N 19/109* (2014.01)
*H04N 19/52* (2014.01)
(Continued)

(52) U.S. Cl.
CPC ........... *H04N 19/109* (2014.11); *H04N 19/147* (2014.11); *H04N 19/176* (2014.11); *H04N 19/46* (2014.11); *H04N 19/52* (2014.11); *H04N 19/61* (2014.11)

(58) Field of Classification Search
None
See application file for complete search history.

(56) References Cited

U.S. PATENT DOCUMENTS 6,483,946 B1 * 11/2002 Martucci et al. ............... 382/240
2003/0206594 A1 * 11/2003 Zhou ........................ 375/240.16
(Continued)

FOREIGN PATENT DOCUMENTS

| WO | 2008027192 A2 | 3/2008 |
| WO | 2008117158 A1 | 10/2008 |
| WO | 2009051719 A2 | 4/2009 |

OTHER PUBLICATIONS

Jun Sung Park and Hyo Jung Song, "Selective Intra Prediction Mode Decision for H.264/AVC Encoders", Jan. 23, 2008, World Academey of Science, Engineering and Technology, vol. 13.*

(Continued)

*Primary Examiner* — Sath V Perungavoor
*Assistant Examiner* — Janese Duley
(74) *Attorney, Agent, or Firm* — David D. Brush; Westman, Champlin & Koehler, P.A.

(57) ABSTRACT

A method and apparatus are provided for coding a signal from images, the images being split into sub-blocks of pixels. The method includes grouping at least two sub-blocks into at least one block of larger size, when the sub-blocks comply with at least one predetermined grouping criterion. A prediction is performed by applying at least one mode of motion prediction using at least two distinct motion prediction vectors, for at least one block of larger size, the motion prediction vectors being associated respectively with sub-sets of the block of larger size, comprising at least one of the sub-blocks of the block of larger size. The sub-sets are predefined and distinct.

16 Claims, 4 Drawing Sheets

(51) Int. Cl.
*H04N 19/176* (2014.01)
*H04N 19/147* (2014.01)
*H04N 19/46* (2014.01)
*H04N 19/61* (2014.01)

(56) References Cited

U.S. PATENT DOCUMENTS

2008/0049834 A1* 2/2008 Holcomb et al. .......... 375/240.2
2008/0084930 A1* 4/2008 Sekiguchi et al. ....... 375/240.16
2008/0253670 A1* 10/2008 Tanigawa ..................... 382/238
2010/0220790 A1* 9/2010 Jeon et al. ................ 375/240.16

OTHER PUBLICATIONS

Joel Jung et al., "Competition-Based Scheme for Motion Vector Selection and Coding" Joint Video Team (JVT) of ISO/IEC MPEG & ITU-T VCEG (ISO/IEC JTC1/SC29/WG11 and ITU-T SG16 Q6), XX, XX, No. VCEG-ACO6rl, Aug. 2, 2006, XP030003490.

Chen P. et al., "Video Coding Using Extended Block Sizes" 36. VCEG Meeting; Oct. 8, 2008-Oct. 10, 2008; San Diego, US; Video Coding Experts Group of ITU-T SG. 16), Oct. 15, 2008, XP030003645.

French Search Report and Written Opinion dated Dec. 14, 2009 for corresponding French Application No. 0954290, filed Jun. 23, 2009.

International Search Report and Written Opinion dated Sep. 14, 2010 for corresponding International Application No. PCT/FR2010/051248, filed Jun. 21, 2010.

English Translation of the International Preliminary Report on Patentability and Written Opinion dated Sep. 14, 2010 for corresponding International Application No. PCT/FR2010/051248, filed Jun. 21, 2010.

* cited by examiner

METHOD OF CODING AND DECODING IMAGES, CORRESPONDING DEVICE FOR CODING AND DECODING AND COMPUTER PROGRAM

CROSS-REFERENCE TO RELATED APPLICATIONS

This Application is a Section 371 National Stage Application of International Application No. PCT/FR2010/051248, filed Jun. 21, 2010, which is incorporated by reference in its entirety and published as WO 2010/149914 on Dec. 29, 2010, not in English.

STATEMENT REGARDING FEDERALLY SPONSORED RESEARCH OR DEVELOPMENT

None.

THE NAMES OF PARTIES TO A JOINT RESEARCH AGREEMENT

None.

FIELD OF THE DISCLOSURE

The field of the disclosure is that of the encoding and decoding of a video stream constituted by a series of successive images. More specifically, the disclosure can be applied to the compression of images or video sequences using a representation of the video sequence by blocks and a prediction of motion vectors.

The disclosure can be applied especially, but not exclusively, to video encoding implemented in present-day video encoders and their amendments (MPEG, H.264, H.264 SVC, H.264 MVC, etc.) or to future encoders (ITU-T/VCEG (H.265) or ISO/MPEG (HVC), and to the corresponding decoding.

BACKGROUND OF THE DISCLOSURE

Digital images and image sequences occupy a great deal of memory space, making it necessary when transmitting these images, to compress them in order to avoid problems of congestion in the communications network used for this transmission as the bit rate used for this network is generally limited. This compression is also desirable for the storage of these pieces of data.

There already exist numerous known video data compression techniques. Among them, numerous video-encoding techniques, especially the H.264 technique, use techniques of spatial or temporal prediction of groups of blocks of pixels of a current image relatively to other groups of blocks of pixels belonging to the same image or to a previous or following image.

More specifically, according to this H.264 technique, I images are encoded by spatial prediction (intra prediction) and P and B images are encoded by temporal prediction (inter prediction) relatively to other I, P or B images encoded/decoded by means of motion compensation.

These images are sub-divided into blocks comprising a set of pixels (for example 8×8). For each block, there is encoded a residual block, also called a prediction residue, corresponding to the original block minus a prediction. After this predictive encoding, the blocks of pixels are transformed by a discrete cosine transform type of transform and then quantized. The coefficients of the quantized blocks of pixels are then scanned in a reading order making it possible to exploit the large number of zero coefficients in the high frequencies, and are then encoded by an entropic encoding.

According to the H.264 technique for example, for each block the following are encoded:
 the encoding type (intra prediction, inter prediction, default or skip prediction for which no information is transmitted to the decoder);
 the type of partitioning;
 the information on the prediction (orientation, reference image, etc);
 the motion information if necessary;
 the encoded coefficients;
 etc.

The decoding is done image by image and for each image it is done block by block. For each block, the corresponding elements of the stream are read. The inverse quantification and the inverse transformation of the coefficients of the blocks are done. Then, the prediction of the block is computed and the block is rebuilt by adding the prediction to the decoded prediction residue.

The H.264/MPEG-4 AVC standard thus proposes an encoding implementing a motion vector prediction defined from the median of the components of the motion vectors of the neighboring blocks. For instance, the motion vector used on a block encoded in "inter" mode is encoded by means of a predictive encoding such as the following:
 at a first stage, a prediction vector for the motion vector of the block considered is set up. Typically, such a vector, known as a median predictor, is defined from the median values of the components of already encoded blocks;
 at a second stage, the prediction error, i.e. the difference between the motion vector of the current block and the previously established prediction vector is encoded.

An extension of this technique of motion vector prediction is proposed by J. Jung and G. Laroche in the document <<Competition-Based Scheme for Motion Vector Selection and Coding>>, ITU-T VCEG, AC06, July 2006.

This technique consists in placing, for example, several predictors or prediction candidate vectors (beyond the median predictor used by AVC) in competition and indicating which vector, of the set of candidate prediction vectors, is the vector effectively used.

These compressive encoding techniques are efficient but are not optimal for compressing images comprising areas of homogenous texture. Indeed, in the H.264/MPEG-4 AVC standard, the spatial prediction of a block in an image relatively to another block in this same image is possible only if this other block is a neighboring block of the block to be predicted and is located in certain predetermined directions relatively to this one, block, i.e. generally above and to the left in a neighborhood known as a "causal" vicinity. Similarly, the prediction of the motion vectors of a block of an image is a causal prediction relatively to the motion vectors of neighboring blocks.

A technique of encoding using extended block sizes has been proposed by P. Chen, Y. Ye and M. Karczewicz in the document "Video coding Using Extended Block Sizes", ITU-T COM16-C123, January 2009, in an extension of a hybrid video encoder using blocks (e.g. the AVC method).

According to this document, the use of extended-size blocks makes it possible, in motion compensation encoding modes, to limit the cost of encoding motion information by proposing the encoding of a motion vector for a homogenous zone of greater extent than a block of predetermined size. Besides, the use of an extended-size block enables the use of a transformation of extended support to be applied to the motion compensation residue. An extended transformation of this kind also makes it possible to gain compression through a greater decorrelation capacity, but also efficient signaling to signal zero residues. The extended size blocks are especially beneficial for the encoding of high-resolution video sequences and are traditionally placed in competition with classic-sized blocks.

Thus, the use of such an extended-size block to represent the pieces of motion information makes it possible to gain in compression efficiency because only one motion vector is encoded for the extended-size block and is well suited to zones where the motion is constant. The motion vector is therefore supposed to be constant within the extended-size block. However, this uniform motion mode is restrictive in the case of motions that are not constant but have similar characteristics. For example, this technique for a orange-colored uniform-textured zone will represent a constant motion on the homogenous zone, whereas certain blocks or sub-blocks, a sub-block being a subset of a block of pixels, of this zone can show disparities of motion linked for example to the maintenance of a fabric.

The solution typically proposed to overcome this problem implements a sub-division of extended-size blocks into sub-blocks, a sub-block being a subset of a block of pixels, and the defines for each sub-block a motion vector. However, this solution amounts to encoding as many motion vectors as there are sub-blocks in the extended-size block and proves to be very costly in terms of signaling.

The inventors have therefore identified the need for a novel technique for obtaining especially better performance in encoding an extended size block while at the same time restricting the cost of the signaling, and thus providing for better compression efficiency while ensuring faithful representation of the movement to be encoded.

SUMMARY

An exemplary embodiment of the invention relates to a method for encoding a signal of images, the images being sub-divided into sub-blocks of pixels, comprising a step for grouping at least two sub-blocks into at least one extended-size block when the sub-blocks meet at least one predetermined grouping criterion.

According to an embodiment of the invention, a method of this kind implements, for at least one group, a prediction step applying at least one motion prediction mode using at least two distinct motion prediction vectors for at least one extended-size block, the motion prediction vectors being associated respectively with subsets of said extended-size block, comprising at least one of said sub-blocks of said extended-size block, the subsets being predefined and distinct.

By way of a reminder, a block of extended size is considered to group together sub-blocks meeting at least one predetermined grouping criterion. In general, the grouping criterion used for the formation of extended-size blocks seeks to increase the efficiency of representation.

For example, the grouping criterion considered may be based on a similarity between color vectors: in other words, if the difference between four color vectors characterizing four distinct sub-blocks is below a predetermined threshold, these four color vectors are considered to be similar and the four sub-blocks characterized by these parameters may be grouped together in an extended-size block.

Other embodiments of the invention may take account of a criterion of grouping based on luminance, texture, motion information and/or again a grouping of sub-blocks maximizing the bit rate/distortion ratio etc.

Thus, an embodiment of the invention relies on a novel and inventive approach to the encoding of image signal, and more particularly the predictive encoding of motion prediction vectors, enabling the motion prediction to be adapted and optimized within at least one extended-size block, through the use of at least one motion prediction mode using at least two distinct motion prediction vectors while at the same time providing high efficiency of compression according to a method implemented in a transmitter and reproducible in at least one receiver.

Indeed, an embodiment of the invention is based on the use, for at least one extended-size block, of a motion prediction mode using two distinct motion prediction vectors respectively associated with at least two sub-blocks of the extended-size block. This technique thus provides the possibility of having a second motion prediction vector available for at least one sub-block of the extended-size block. This possibility enhances the representation of motion to be encoded while at the same time limiting the cost of its signaling (only one mode to be signaled for the entire extended-size block).

According to one particular embodiment, the prediction step implements, for at least one extended-size block, a placing in competition of at least two motion prediction modes, selecting one of the motion prediction modes, called a selected motion prediction mode, according to a predetermined selection criterion.

Thus, an embodiment of the invention enables an optimized choice of the motion prediction mode by placing several prediction modes in competition for at least one extended-size block. Thus, a more appropriate motion prediction mode is obtained to describe the motion of all the sub-blocks which constitute the extended-size block.

In other words, the selected motion prediction mode enables the prediction of the sub-blocks of the extended-size block along at least two distinct motion prediction vectors. The technique of an embodiment of the invention thus makes it possible to enhance and refine the range of possible motions without greatly increasing the cost of signaling.

The selection of the optimized motion prediction mode is done for example according to a selection criterion maximizing a ratio between the bit rate (the number of bits transmitted per second) and the distortion (the difference between the transmitted signal and the received signal due to the transmission channel).

According to one particular embodiment, the placing in competition is applied to a set of available motion prediction modes and selects, as a selected motion prediction mode, the best of the motion prediction modes according to the selection criterion.

Thus, the method of encoding according to an embodiment of the invention makes it possible to determine the best motion prediction mode of an extended-size block, selected from among a set of available motion prediction modes. This motion prediction mode then makes it possible to obtain the best possible prediction result, thus improving the quality of encoding of the image.

Besides, according to one variant of this particular embodiment, the placing in competition is interrupted as soon as the predetermined criterion is achieved, for example as soon as a motion prediction mode tested during the step for placing in competition reaches an acceptable value of the selection criterion maximizing a ratio between the bit rate and the distortion. This alternative embodiment limits the processing time for placing in competition, thus making the encoding faster but to the slight detriment of encoding quality.

According to one particular characteristic of an embodiment of the invention, the encoding method implements, for at least one extended-size block, a step of insertion, into the signal of images, of a piece of information identifying the selected motion prediction mode.

Such a signal of images will inform the decoder, for an extended-size block, of the selected motion prediction mode with which it is associated.

According to one embodiment of the invention, the motion prediction mode belongs to the group comprising the following prediction modes:
- a mode called a "left mode" associating, with a sub-block of said extended-size block, a motion prediction vector corresponding to the motion vector used for the sub-block situated outside to the left of the extended-size block and on a same row as the sub-block considered;
- a mode called a "top mode" associating, with a sub-block of said extended-size block, a motion prediction vector corresponding to the motion vector used for the sub-block situated outside on top of the extended-size block and on the same column as the sub-block considered;
- a mode called a "diag mode" associating, with a sub-block of said extended-size block, a motion prediction vector corresponding to the motion vector used for the sub-block situated on the same diagonal as the sub-block considered and outside, on top and to the left of the extended-size block;
- a mode called a "left recursive mode" associating, with a sub-block of said extended-size block, a motion prediction vector corresponding to the motion vector used for the already encoded sub-block, situated directly to the left on the same row as the sub-block considered;
- a mode called a "weighted diag mode" associating, with a sub-block of said extended-size block, a motion prediction vector corresponding to a motion vector resulting from a weighting performed between the motion vector used for the sub-block situated on the same diagonal as the sub-block considered and outside, beneath and to the left of the extended-size block, and the motion vector used for the sub-block situated on the same diagonal as the sub-block considered and outside, on top and to the right of the extended-size block;
- a combination (or "derivation") of at least two of the previously listed prediction modes, for example in the same way as it is possible to use a "left recursive" motion prediction mode, it is possible to consider a "top recursive" mode.

Thus, for at least one extended-size block, an embodiment of the invention proposes to place all the motion prediction modes referred to here above in competition and to select the motion prediction mode most efficient for the prediction of the sub-blocks which constitute the extended-size block considered. If, for example, the motion prediction mode selected corresponds to the "left" motion prediction mode and if the extended-size block is a square of 32×32 sub-blocks, each sub-block will be associated with a prediction vector corresponding to the motion vector used for the sub-block situated outside to the left of the extended-size block and on the same row as the sub-block considered. Through the allocation of this motion prediction mode, the extended-size block considered will encode thirty-two subsets (corresponding to the rows) of the thirty-two sub-blocks, each of these subsets being associated with thirty-two motion prediction vectors which may or may not be distinct.

According to another aspect of an embodiment of the invention, the motion prediction mode belongs to the group also comprising at least one of the following prediction modes:
- a mode called "DC left" associating, with all the sub-blocks of the extended-size block, the motion prediction vector representing at least one motion vector used for at least one sub-block situated directly to the left, outside the extended-size block;
- a mode called "DC top" associating, with all the sub-blocks of the extended-size block, the motion prediction vector representing at least one motion vector used for at least one sub-block situated directly above and outside the first sub-block of the extended-size block.

Thus, an embodiment of the invention also makes it possible to place classic prediction modes such as "DC left" and "DC top" in competition with the novel prediction modes cited here above. Indeed, the novel "left mode", "top mode" and "diag mode" prediction modes for example use at least two motion prediction vectors while the classic "DC left" and "DC top" modes use a single motion prediction vector.

According to one particular embodiment of the invention, the following are associated with all the sub-blocks of the extended-size block:
- the motion prediction vector corresponding to the motion vector used for the first sub-block outside the extended-size block directly situated to the left of the first sub-block of the extended-size block, for a mode called "DC left", or
- the motion prediction vector corresponding to the motion vector used for the first sub-block outside the extended-size block directly situated above the first sub-block of the extended-size block for a mode called "DC top".

According to another embodiment, the following are associated with all the sub-blocks of the extended-size block:
- a combination of the motion prediction vectors corresponding to the motion vectors used for the column of sub-blocks outside the extended-size block situated directly to the left of the extended-size block, for a mode called "DC left", or
- a combination of the motion prediction vectors corresponding to the motion vectors used for the row of sub-blocks outside the extended-size block situated above the extended-size block, for a mode called "DC top".

According to one particular characteristic of an embodiment of the invention, the encoding method comprises a step for determining a difference, called a residue, between a motion vector of at least one of said sub-blocks and a motion prediction vector associated with it.

For example, a zero residue indicates a perfect prediction. The mapping of these residues for the extended-size block can also be considered to be a criterion of selection of the best motion prediction mode. For example, for a motion prediction mode placed in competition, the median value is set up for all the sub-blocks that constitute the extended-size block. Once all the median values determined for each motion prediction mode placed in competition have been obtained, the lowest median value indicates a good prediction and enables the selection of the motion prediction mode with which it is associated. Thus, one embodiment of the invention can use a placing in competition of motion prediction modes implementing a computation of residue of each sub-block of the extended-size block in order to select a motion prediction mode minimizing the value of the residues obtained.

Besides, such an encoding method implements a technique for grouping the encoding of motion vector residues of the sub-blocks of said extended-size block and also implements a signaling belonging to the group comprising signalings of the following type:

"zerotree" signaling in which the value of each branch representing the residues is close to zero;

signaling "by range" consisting in encoding series of consecutive residues of a same value;

etc.

A zerotree operation consists of the use of a tree for hierarchically grouping sub-blocks constituting the extended-size block, and informing at the level of the branches if the "offspring" of the branch considered all have a zero residue or not. In other words, such a tree implements a recursive regrouping of sub-blocks sets.

Another aspect of an embodiment of the invention pertains to a computer program comprising instructions for implementing the encoding method as described here above, when the program is executed by a processor.

It can be noted indeed, that the encoding method according to an embodiment of the invention can be implemented in various ways, especially in wired form and/or in software form.

In another embodiment, the invention concerns a device for encoding a signal of images, the images being sub-divided into sub-blocks of pixels, comprising means for grouping at least two sub-blocks into at least one extended-size block when said sub-blocks meet at least one predetermined grouping criterion.

According to an embodiment of the invention, a device for encoding of this kind comprises prediction means applying at least one motion prediction mode using at least two distinct motion prediction vectors, for at least one extended-size block, the motion prediction vectors being associated respectively with subsets of said extended-size block, comprising at least one of said sub-blocks of said extended-size block, the subsets being predefined and distinct.

An encoding device of this kind is adapted especially to implementing the encoding method described here above. It is for example an MPEG or H.264 type encoder or a encoder according to a future compressing standard.

This device could of course comprise the different characteristics pertaining to the encoding method of an embodiment of the invention.

Another aspect of an embodiment of the invention pertains to a method for decoding a signal of images, the images being sub-divided into sub-blocks of pixels, comprising a step for grouping at least two sub-blocks in at least one extended-size block, when said sub-blocks meet at least one predetermined grouping criterion.

According to an embodiment of the invention, such a method implements a prediction step applying at least one motion prediction mode using at least two distinct motion prediction vectors for at least one extended-size block, the motion prediction vectors being associated respectively with subsets of said extended-size block, comprising at least one of said sub-blocks of said extended-size block, said subsets being predefined and distinct.

According to one particular embodiment, the prediction step implements a step for decoding a piece of information identifying said selected motion prediction mode, inserted by the encoding into said signal of images.

In this way, the decoding technique according to an embodiment of the invention makes it possible, after reception and reading of the encoding information and more particularly an identification piece of information, to determine the motion prediction mode selected when encoding corresponding to the extended-size block being decoded, from a set of motion prediction modes known to the encoder and the decoder.

Another aspect of an embodiment of the invention pertains to a computer program comprising instructions to implement the decoding method as described above, when said program is executed by a processor.

It is noted indeed that the decoding method of an embodiment of the invention can be implemented in various ways, especially in wired form and/or in software form.

In another embodiment, the invention concerns a device for decoding a signal of images, the images being sub-divided into sub-blocks of pixels, comprising means for grouping sub-blocks in at least one extended-size block, when said sub-blocks meet at least one predetermined grouping criterion.

According to an embodiment of the invention, such a device comprises prediction means applying at least one motion prediction mode using at least two distinct motion prediction vectors for at least one extended-size block, the motion prediction vectors being associated respectively with subsets of said extended-size block, said subsets being predefined and distinct, comprising at least one of said sub-blocks.

A decoding device of this kind is adapted especially to implementing the decoding method described here above. It is for example an MPEG or H.264 type decoder or a decoder according to a future decoding standard.

This decoding device could of course comprise the different characteristics pertaining to the encoding method of an embodiment of the invention.

BRIEF DESCRIPTION OF THE DRAWINGS

Other features and advantages shall appear more clearly from the following description of a particular embodiment given by way of a simple illustratory and non-limiting example and from the appended figures, of which.

DETAILED DESCRIPTION OF ILLUSTRATIVE EMBODIMENTS

1. General principle

The general principle of an embodiment of the invention relies on the building of extended-size blocks within at least one image. Such extended-size blocks are built by the grouping of sub-blocks showing a predetermined grouping criterion. For example, if the difference between two color vectors associated with two distinct sub-blocks is below a predetermined threshold, then these two sub-blocks can be grouped together on the basis of their similar color vector. We could also consider a grouping according to a criterion related to luminance, a piece of motion information and/or again a grouping of sub-blocks maximizing the bit rate/distortion ratio. In general, an extended-size block is created for reasons of efficiency of representation.

The technique of an embodiment of the invention makes it possible to implement, for at least one extended-size block, a motion prediction mode using at least two distinct motion prediction vectors. These two vectors will be used selectively, as a reference, especially to determine residues as specified here below.

Thus, the term "motion prediction mode" corresponds to the rule which establishes that sub-block or or those sub-blocks from which there is obtained the motion prediction vector associated here below with at least one sub-block of the extended-size block.

According to the encoding method of an embodiment of the invention, a placing in competition is applied to a set of available motion prediction modes for at least one extended-size block. At the end of this placing in competition, there is obtained a motion prediction mode selected for the extended-size block considered previously.

The technique of an embodiment of the invention also makes it possible to insert, into said signal of images, a piece of information on identification of the motion prediction mode selected for at least one extended-size block.

2. Description of embodiments of the encoding method

Figure 1:
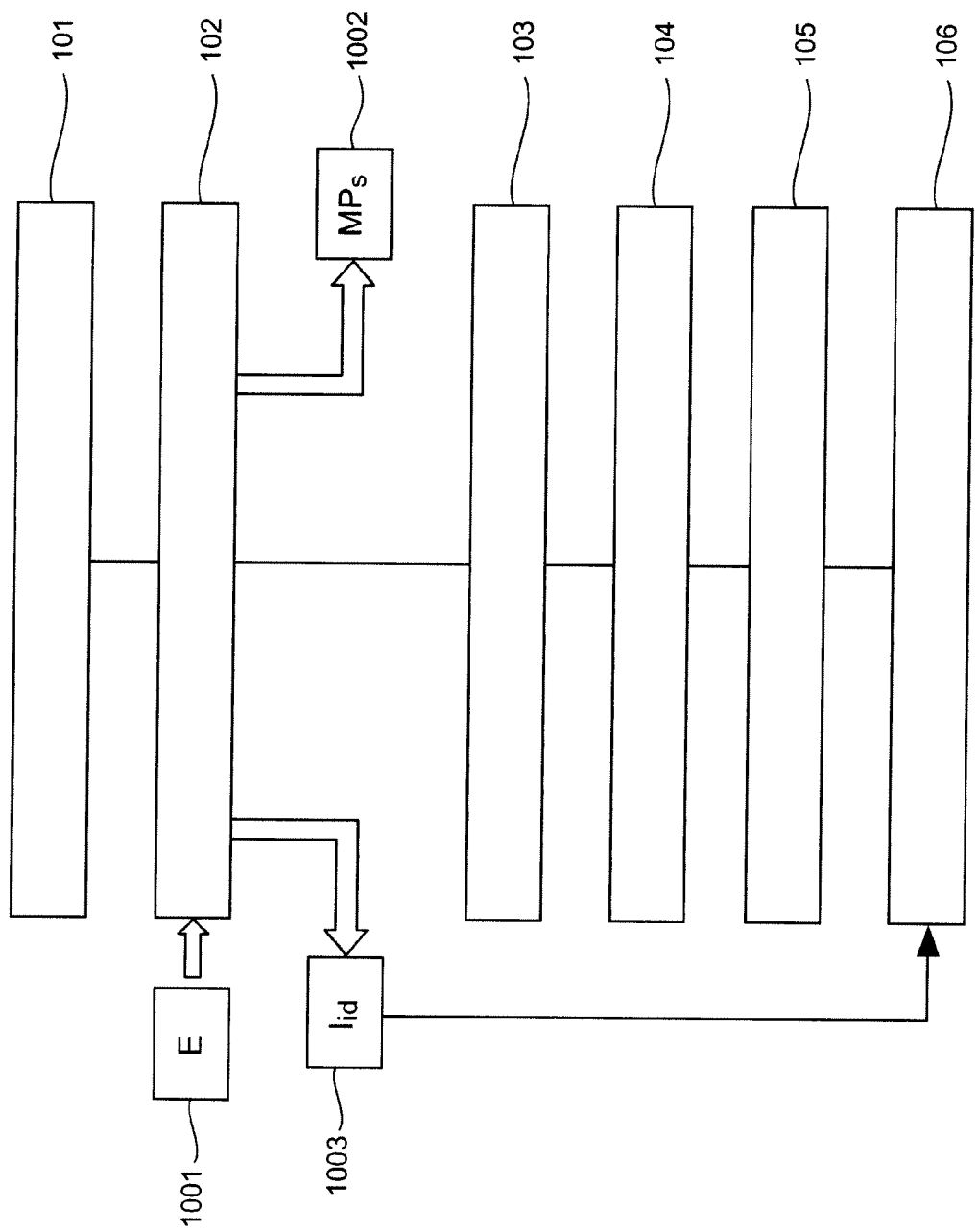
FIG. 1 presents the main steps of the encoding method.

According to one embodiment of the invention and as illustrated in FIG. 1, for a signal of images, the images being sub-divided into sub-blocks of pixels, a first step 101 of groupings of sub-blocks in extended-size block is implemented according to a known technique (described for example in the document by P. Chen, Y. Ye and M. Karczewicz, "Video coding Using Extended Block Sizes", ITU-T COM16-C123, January 2009, already mentioned in relation to the prior art).

Thus, an extended-size block corresponds to the grouping of a set of blocks or sub-blocks of pixels, a sub-block being a subset of a block of pixels. For example, a sub-block is an 8×8 pixel block and an extended-size block groups together 4×4=16 sub-blocks of pixels. This grouping is done as a function of a predetermined grouping criterion. For example, if the difference between two color vectors or again a piece of information on luminance, associated with two distinct sub-blocks, is below a predetermined threshold, these two sub-blocks could be grouped together on the basis of their similar color vector. We can also consider another embodiment implementing a grouping criterion aimed at grouping sub-blocks maximizing the bit rate/distortion ratio. The advantage of the encoding of the information associated with this extended-size block is that it makes it possible to:
- pool information on the entire extended-size block (for example same motion vector, same reference image used etc), for all the sub-blocks that constitute it,
- encode information, by sub-block of pixels (or group of sub-block of pixels), for example, the difference, known as the residue, between a motion vector of at least one of said sub-blocks and a motion prediction vector which is associated with it, encoded by sets of 8×8, 16×16, 32×32 sub-blocks or the like. Once this grouping 101 of sub-blocks into at least one extended-size block is done, the motion prediction codes belonging to a set E (1001) of motion prediction modes of the extended-size block available, are placed in competition 102.

The technique of placing in competition is known and described for example in the document by J. Jung and G. Laroche, "Competition-Based Scheme for Motion Vector Selection and Coding", ITU-T VCEG, AC06, July 2006 also mentioned here above with reference to the prior art.

According to one predetermined selection criterion implemented by the placing in competition, for example a criterion of optimizing the ratio between the bit rate and the distortion, a motion prediction mode called a selected motion prediction mode MPs (1002), adapted to the extended-size block, is thus selected.

The set E (1001) comprises several motion prediction modes of different types. First of all, the set E comprises the classic motion prediction modes, namely "DC left" and "DC top" using a single motion vector for the prediction of all the sub-blocks of the extended-size block considered. Furthermore, the set E also comprises without limitation "less classic" motion prediction modes, among the "left mode", "top mode", "diag mode", "left recursive mode", "weighted diag mode" or a combination of at least two of these modes, implementing at least two distinct motion prediction vectors associated with subsets of distinct sub-blocks of the extended-size block.

For example, the "left mode" consists in associating, with a sub-block of the extended-size block, a motion prediction vector corresponding to the motion vector used for the sub-block situated outside to the left of the extended-size block and on the same row as said sub-block considered.

The mode known as the "left recursive mode" for its part associates, with a sub-block of the extended-size block, a motion prediction vector corresponding to the motion vector used for the already encoded sub-block situated directly to the left on the same row as the sub-block considered.

All these less classic modes are described here below, each in greater detail, with reference to FIGS. 2A to 2G.

According to one embodiment, it can be considered that the placing in competition is interrupted as soon as an acceptable value of the predetermined selection criterion is obtained.

For example, as soon as the energy of the residues of the motion vectors obtained by a motion estimator (device for setting up motion vectors used in the encoder) is below a predetermined threshold, the motion prediction vector meeting this criterion is selected.

Specifically, for an extended-size block containing 8×8 sub-blocks, it is possible to consider a criterion of selection of the motion prediction modes such that the sum of the norms of these residues is below 10, this sum being expressed in "sub-pixels". In general, the sub-pixel position of a pixel (also called a point) is broken down into the position of the lower pixel closest in the lower level of resolution and the shift relatively to this pixel expressed in sub-pixel interval or distance. For example, at a precision of a $16^{th}$ of a pixel, 16 sub-pixel intervals are possible corresponding to 15 sub-pixel positions between two whole pixel positions.

This embodiment has the advantage of processing speed. However, it is obtained to the detriment of a better performance in terms of bit rate/distortion that would have been obtained through an available motion prediction mode that had not yet been placed in competition.

According to another embodiment, the step for placing in competition 102 tests all the available prediction modes and selects the best motion prediction mode according to the predetermined selection criterion.

Besides, the selection of a motion prediction mode adapted to the extended-size block delivers a piece of identification information Iid (1003) of this motion prediction mode.

Then, the encoding method implements a step of prediction 103 of the extended-size block considered, using the previously obtained motion prediction mode. According to the shown embodiment, the prediction step can deliver a prediction residue for each sub-block of the extended-size block considered.

It may be recalled that the term "residue" is understood to mean an original sub-block minus its prediction. For example, in the case of a motion prediction, the term "residue" denotes the difference between a motion vector of at least one of said sub-blocks and a motion prediction vector associated with it. A zero residue then corresponds to a perfect prediction.

Here below, the final motion vector associated with the sub-block of the extended-size block considered then corresponds to the motion prediction vector defined by the previously selected motion prediction mode, to which the motion vector residue obtained for this sub-block is added.

Thus, if a residue is non-zero for a sub-block, the "left mode" and "left recursive mode" prediction modes defined here above do not lead to the same motion field in the end.

Furthermore, the embodiment of the invention implements a step 104 for grouping residues of motion vectors to be encoded for the sub-blocks of an extended-size block. This step consists in grouping the encoding of the residues of the sub-blocks having residues of similar values, in other words having a proximate value.

For example, a zerotree type signaling of this grouping can be used in order to define those sub-blocks on which the motion residue is zero or not zero.

Then, the method implements a step of encoding by motion compensation 105 of the extended-size block. It must be noted that, although an extended-size block is defined, the motion compensation is done separately for each sub-block because these sub-blocks do not necessarily all have the same movement as seen here above.

Following the motion compensation, the texture residue (values of luminance/chrominance to be added to the prediction values of the block considered in order to obtain the rebuilt block) can also be encoded indifferently sub-block by sub-block using a classic transform (i.e. DCT, Hadamard transform etc) on these blocks or equally well by means of an extended-size transformation (i.e. a transformation on extended-size blocks as compared with classic-sized 4×4, 8×8, 16×16 blocks (here, we can have DCT, Hadamard and other types of transforms) on the extended-size block (or on intermediate-sized blocks).

Besides, the encoding method according to an embodiment of the invention implements a step 106 for inserting the piece of information on identification lid 1003 enabling the selected motion prediction mode MPs 1002 to be identified.

Referring to FIGS. 2A to 2G, we present the respective working of the classic motion prediction modes "DC left", "DC top", "left mode", "top mode", "diag mode", "weighted diag mode" and "left recursive mode".

For reasons of clarity, for all the FIGS. 2A to 2G, a sub-block is represented by its (x,y) coordinates. A sub-block of (x,y) coordinates corresponds to the $x^{th}$ horizontal sub-block of the $y^{th}$ row of sub-blocks in the extended-size block. The sub-block (0,0) corresponds to the first sub-block 2000 situated to the top left in the extended-size block 200 comprising 4×4 sub-blocks of pixels. Thus, according to this convention of representation, the sub-block (−1,0) corresponds for example to the sub-block 201 of FIG. 2A situated directly at the top left of the extended-size block. Furthermore, the starting point of the arrows shown in these figures defines those sub-blocks from which the motion vector is assigned (motion prediction vector+residue) as the motion prediction vector of the sub-block of the extended-size block to be encoded, designated by the arrival point of the corresponding arrow.

Figure 2A:
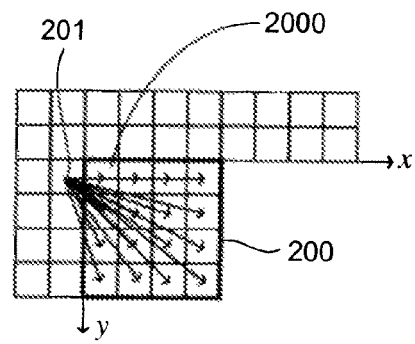
FIGS. 2A to 2G present different motion prediction modes.

We refer now to FIG. 2A representing the classic motion prediction mode "DC left". In this motion prediction mode, the prediction vector of all the sub-blocks of the extended-size block correspond to the motion vector used for the sub-block (−1,0) 201 situated to the left of the extended-size block 200 considered.

According to one embodiment, not shown, it is also possible to assign a motion prediction vector to the set of sub-blocks of the extended-size block, this motion prediction vector corresponding to the median vector of a set of sub-blocks situated to the left of the extended-size block, for example the sub-blocks (−1,0), (−1,1), (−1,2), (−1,3). As shall be noted, this classic motion prediction mode associates a same motion prediction vector with all the sub-blocks within the extended-size block and forms part of the prior art.

Figure 2B:
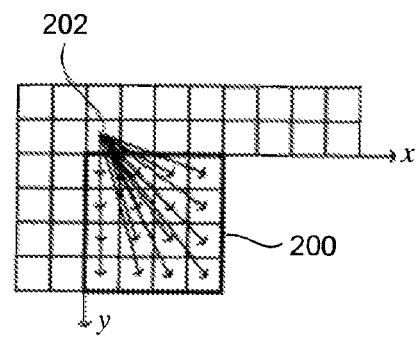

Referring to FIG. 2B, we consider the "DC top" motion prediction mode. According to this classic motion prediction mode, the motion prediction vector of all the sub-blocks of the extended-size block corresponds to the motion vector used for the sub-block (0,−1) 202 situated above the extended-size block 200 considered.

Just as in the case of the "DC left" motion prediction mode, a variant of the embodiment exists and is not shown. It implements the assigning of all the sub-blocks of the extended-size block of a motion prediction vector corresponding to the median vector of a set of sub-blocks situated above the extended-size block, for example the sub-blocks (0,−1), (1,−1), (2,−1), (3,−1).

Figure 2C:
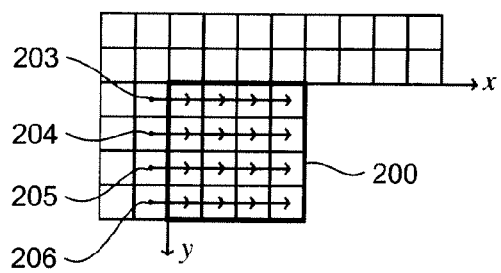

Referring to FIG. 2C, a description is provided below of a novel motion prediction mode called a "left mode". This "left mode" associates, with a sub-block of said extended-size block, a motion prediction vector corresponding to the motion vector used for the sub-block situated outside to the left of the extended-size block and on the same row as said sub-block considered. Thus, referring to FIG. 2C, the motion prediction vector of the sub-blocks (0,0), (1,0), (2,0) and (3,0) corresponds to the motion vector of the sub-block (−1,0) referenced 203.

Similarly, the motion prediction vector of the sub-blocks of the second row (comprising the sub-blocks (0,1), (1,1), (2,1) and (3,1)), the third row (comprising the sub-blocks (0,2), (1,2), (2,2) and (3,2)), and the fourth row (comprising the sub-blocks (0,3), (1,3), (2,3) and (3,3)) of the extended-size block corresponds respectively to the motion vector of the sub-blocks (−1,1), (−1,2), (−1,3) referenced respectively 204, 205, 206 in FIG. 2C.

It can be noted that the "left mode" motion prediction vector uses, in the case shown in FIG. 2C, four motion prediction vectors which may or may not be distinct, thus enabling a description of a non-uniform motion within the extended-size block.

Figure 2D:
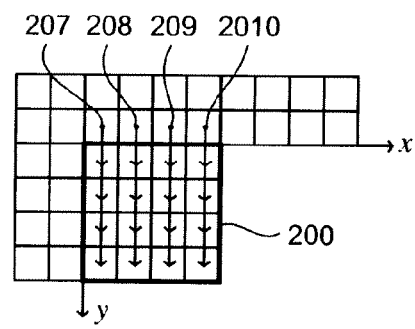

Referring to FIG. 2D, a description is provided here below of a second novel motion prediction mode, called a "top mode". This "top mode" associates, with a sub-block of said extended-size block, a motion prediction vector corresponding to the motion vector used for the sub-block situated outside and above the extended-size block and on the same row as said sub-block considered.

Thus, with reference to FIG. 2D, the motion prediction vector of the sub-blocks (0,0), (0,1), (0,2) and (0,3) corresponds to the motion vector of the sub-block (0,−1) referenced 207. Similarly, the motion prediction vector of the sub-blocks of the second column (comprising the sub-blocks (1,0), (1,1), (1,2) and (1,3)), the third column (comprising the sub-blocks (2,0), (2,1), (2,2) and (2,3)), and the fourth column (comprising the sub-blocks (3,0), (3,1), (3,2) and (3,3)) of the extended-size block corresponds respectively to the motion vector of the blocks (1,−1), (2,−1), (3,−1) referenced respectively 208, 209, 210 in FIG. 2D.

Figure 2E:
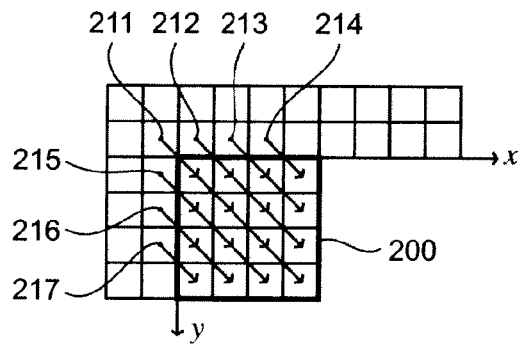

Referring to FIG. 2E, we describe here below a third novel motion prediction mode called the "diag mode". This "diag mode" associates, with a sub-block of said extended-size block, a motion prediction vector corresponding to the motion vector used for the sub-block situated on the same diagonal as the sub-block considered and outside the extended-size block and outside, on top and to the left of the extended-size block.

Thus, with reference to FIG. 2E, the motion prediction vector of the sub-blocks (0,0), (1,1), (2,2) and (3,3) corresponds to the motion vector of the sub-block (−1,1) referenced 211. Similarly, the motion prediction vector of the sub-blocks of the diagonal comprising the sub-blocks (0,1), (1,2), (2,3), the diagonal comprising the sub-blocks (0,2) and (1,3), the diagonal comprising the sub-blocks (0,3), the diagonal comprising the sub-blocks (1,0), (2,1), (3,2), the diagonal comprising the sub-blocks (2,0) and (3,1), the diagonal comprising the sub-block (3,0) of the extended-size block corresponds respectively to the motion vector of the blocks (−1,0), (−1,1), (−1,2), (0,−1), (1,−1), (2,−1) referenced respectively 215, 216, 217, 212, 213, 214.

Figure 2F:
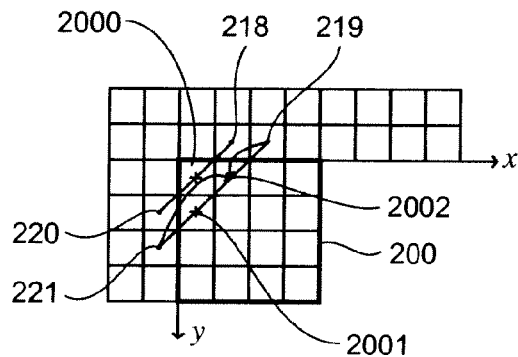

Referring to FIG. 2F, a description is provided here below of a fourth novel motion prediction mode called the "weighted diag mode". This "weighted diag mode" associates, with a sub-block of said extended-size block, a motion prediction vector corresponding to the motion vector resulting from a weighting done between the motion vector of the sub-block situated on the same diagonal as said block considered and outside, beneath and to the left of the extended-size block, and the motion vector used for the sub-block situated on the same diagonal as said sub-block considered and outside, on top and to the right of the extended-size block.

Thus, referring to FIG. 2F, the motion prediction vector of the sub-blocks (0,0) referenced 2000 corresponds to the weighting done between the motion vector of the sub-block (−1,1) referenced 220 and the motion vector of the sub-block (1,−1) referenced 218.

Similarly, the motion prediction vector of the sub-blocks (0,1) and (1,0) respectively referenced 2001 and 2002 corresponds to the weighting done between the motion vector of the sub-block (−1,2) referenced 221 and the motion vector of the sub-block (2,−1) referenced 219.

The weighting rule according to this embodiment can be represented by the following equations for a block (x,y):

if x+y<X, then the value V of the motion prediction vector is such that V=[(y+1)*U+(x+1)*W]/(x+y+2) with:
X corresponding to the size of a sub-block, for example sized 8×8 pixels;
U the vector of the sub-block (−1, x+y+1);
W the vector of the sub-block (x+y+1,−1);
else, we take the vector R of the sub-block (x−1,y) if x>0, and if not the vector S of the sub-block (x, y−1).

Figure 2G:
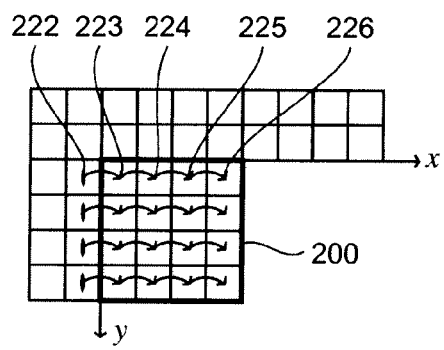

For example, referring to FIG. 2F, the motion prediction vector V of the sub-block (0,1) referenced 2001 is obtained such that:

x=0 and y=1 and verify x+y<X (1<8), thus V=(2*U+W)/3 with U being the vector of the sub-block (−1,2) referenced 221 and W being the vector of the sub-block (2,−1) referenced 219. Referring to FIG. 2G, a description is provided below of a fifth novel motion prediction mode, known as the "left recursive mode". This "left recursive mode" associates, with a sub-block of said extended-size block, a motion prediction vector corresponding to the motion vector used for the sub-block already encoded, situated directly to the left on the same row as the sub-block considered.

Thus, referring to FIG. 2G, the motion prediction vector of the sub-block (0,0) referenced 223 in FIG. 2G corresponds to the motion vector of the sub-block (−1,0) referenced 222. It is observed that the same result is obtained here for the sub-block (0,0) as with the "left mode" motion prediction mode. The difference between the "left mode" motion prediction mode and the "left recursive" motion prediction mode appears when passing to the sub-block (1,0) referenced 224. Indeed, the motion prediction vector of the sub-block (1,0) corresponds to the motion vector of the sub-block (0,0) previously encoded in considering that the motion vector of the sub-block (0,0) corresponds to the motion prediction vector of the sub-block (0,0) plus the prediction residue. In other words, the motion prediction vector of the sub-block (0,0) differs from the motion prediction vector of the sub-block (1,0) by the residue associated with the sub-block (0,0).

Thus, if we consider the first row of the extended-size block 200 comprising the sub-blocks (0,0), (1,0), (2,0) and (3,0), respectively referenced 223, 224, 225 and 226, the motion prediction vectors differ from one sub-block to the other of the row (except for the case where the prediction residue is zero) unlike to what is applied by the "left mode" motion prediction mode which applies the same motion prediction vector to all the sub-blocks of a same row of the extended-size block.

Alternatives to these embodiments, not shown, can also use other motion prediction modes. Indeed, in general, an embodiment of the invention places in competition any motion prediction mode associating, with an extended-size block, a motion prediction vector corresponding to the motion vector or a combination of motion vectors used for:
at least one already encoded sub-block, situated outside the extended-size block,
at least one already encoded sub-block, situated in the extended-size block,
at least one already encoded sub-block in a layer of description of a level (or "coarse" level) lower than the current enhancement layer (undergoing encoding) in the particular case of a scalable image encoder (according to the H.264 SVC standard for example), having a hierarchical layered structure,
etc.

3. Description of Embodiments of the Decoding Method

The principle of an embodiment of the invention relies on the implementation, when encoding and decoding, of a same method of prediction of a motion vector for a block considered.

Figure 3:
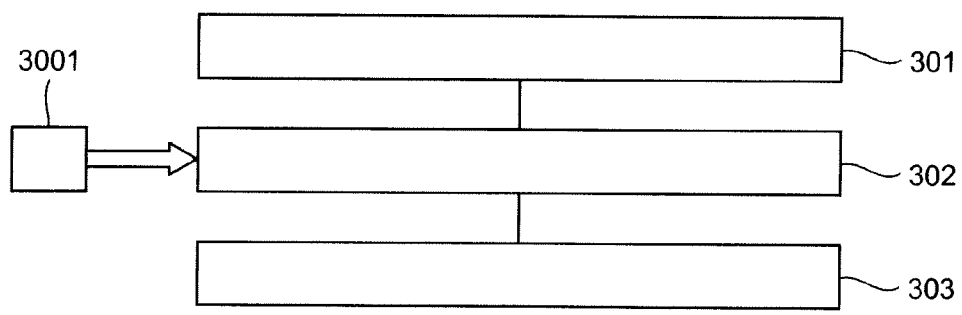
FIG. 3 illustrates the main principles of the decoding method.

A description shall now be given of the main steps of the decoding method according to an embodiment of the invention with reference to FIG. 3 for a signal comprising information identifying the motion prediction mode selected for at least one extended-size block according to an embodiment of the method of the encoding of the invention as described here above.

As illustrated in FIG. 3, the decoding method according to an embodiment of the invention implements a first step 301 for grouping sub-blocks in extended-size blocks implemented according to a prior-art technique (described for example in the document P. Chen, Y. Ye and M. Karczewicz, "Video coding Using Extended Block Sizes", ITU-T COM16-C123, January 2009 already mentioned with reference to the prior art).

According to the shown embodiment, once the grouping 301 into extended-size blocks has been done, the decoding method extracts 302, from the signal of images, for each extended-size block, a piece of information identifying the motion prediction mode selected when encoding.

Then, on the basis of this piece of information, the decoder performs a prediction step 303 implementing, for each extended-size block, the motion prediction mode selected from the set E (3001) identical to the set E (1001) used when encoding. At least one of these modes therefore uses at least two distinct motion prediction vectors.

4. Structure of the Encoding and Decoding Devices

Figure 4:
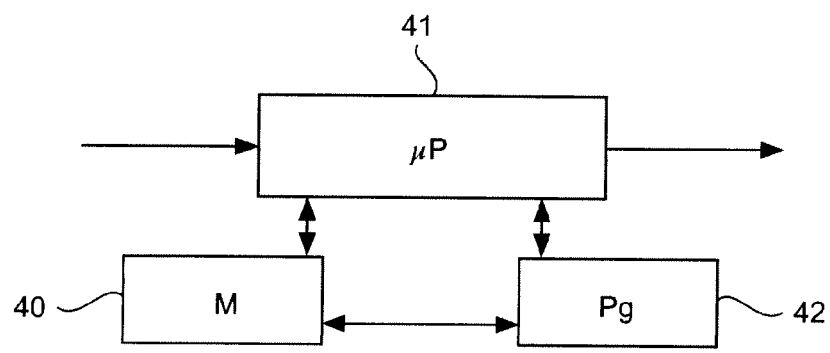
FIGS. 4 and 5 present respectively the structure of an encoding device and of a decoding device according to one particular embodiment of the invention.
Figure 5:
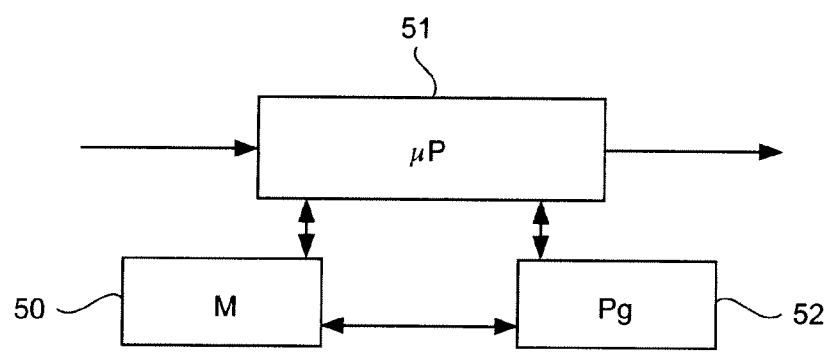

Finally, referring to FIGS. 4 and 5, we present the simplified structure of an encoding device and a decoding device according to the embodiments described here above.

As illustrated in FIG. 4, an encoding device of this kind comprises a memory 40 comprising a buffer memory, a processing unit 41, equipped for example with a microprocessor μP and driven by the computer program 42 implementing the method for encoding according to an embodiment of the invention.

At initialization, the code instructions of the computer program 42 are for example loaded into a RAM and then executed by the processor of the processing unit 41. The processing unit 41 receives a signal of images at input, the images being sub-divided into sub-blocks of pixels, grouped together in at least one extended-size block. The microprocessor of the processing unit 41 implements the steps of the encoding method described here above, according to the instructions of the computer program 42 to select a motion prediction mode and associate the motion prediction vectors with subsets of the extended-size block. To this end, the encoding device comprises, in addition to the buffer memory 40, means for grouping sub-blocks into at least one extended-size block, prediction means applying at least one motion prediction mode using at least two distinct motion prediction vectors. These means are driven by the microprocessor of the processing unit 41. The processing unit 41 therefore transmits, to at least one encoding device, a signal comprising at least one piece of information designating the selected motion vector.

As illustrated in FIG. 5, a device for decoding of this type for its part comprises a memory 50 comprising a buffer memory, a processing unit 51 equipped for example with a processor μP and driven by the computer program 52 implementing the method for decoding according to an embodiment of the invention.

At initialization, the code instructions of the computer program 52 are for example loaded into a RAM and then executed by the processor of the processor unit 51. The processor unit 51 receives at input a signal of images comprising especially a piece of information on identification of the motion prediction mode selected when encoding. The microprocessor of the processing unit 51 implements the steps of the decoding method described here above according to the computer program instructions 52 to decode the encoded sub-blocks. To this end, the decoding device comprises, in addition to the buffer memory 50, means for grouping sub-blocks into at least one extended-size block, prediction means applying at least one motion prediction mode using at least two distinct motion prediction vectors. These means are driven by the microprocessor of the processing unit 51.

Although the present disclosure has been described with reference to one or more examples, workers skilled in the art will recognize that changes may be made in form and detail without departing from the scope of the disclosure and/or the appended claims.

The invention claimed is:

1. A method for encoding a signal of images, said images being sub-divided into sub-blocks of pixels, wherein the method comprises:
    a step of grouping at least three sub-blocks into at least one extended-size block when the sub-blocks meet at least one predetermined grouping criterion; and
    a prediction step applying at least one motion prediction mode using at least two distinct motion prediction vectors for at least one extended-size block, said motion prediction vectors being associated respectively with subsets of said extended-size block, at least one of said subsets comprising at least two of said sub-blocks of said extended-size block being associated to one of said at least two distinct motion prediction vectors, said subsets being predefined and distinct.

2. The method for encoding according to claim 1, wherein said prediction step implements, for at least one extended-size block, placing in competition at least two motion prediction modes, selecting one of the motion prediction modes, called a selected motion prediction mode, according to a predetermined selection criterion.

3. The method for encoding according to claim 2, wherein said placing in competition is applied to a set of available motion prediction modes and selects, as a selected motion prediction mode, the best of the motion prediction modes according to the selection criterion.

4. The method for encoding according to claim 2, wherein the method implements, for at least one extended-size block, a step of insertion, into said signal of images, of a piece of information identifying the selected motion prediction mode.

5. The method for encoding according to claim 1, wherein said motion prediction mode belongs to the group comprising the following prediction modes:
    a mode called a "left mode" associating, with a sub-block of said extended-size block, a motion prediction vector corresponding to the motion vector used for the sub-block situated outside to the left of the extended-size block and on a same row as the sub-block considered;
    a mode called a "top mode" associating, with a sub-block of said extended-size block, a motion prediction vector corresponding to the motion vector used for the sub-block situated outside and on top of the extended-size block and on the same column as the sub-block considered;
    a mode called a "diag mode" associating, with a sub-block of said extended-size block, a motion prediction vector corresponding to the motion vector used for the sub-block situated on the same diagonal as the sub-block considered and outside, on top and to the left of the extended-size block;
    a mode called a "left recursive mode" associating, with a sub-block of said extended-size block, a motion prediction vector corresponding to the motion vector used for the already encoded sub-block, situated directly to the left on the same row as the sub-block considered;
    a mode called a "weighted diag mode" associating, with a sub-block of said extended-size block, a motion prediction vector corresponding to a motion vector resulting from a weighting performed between the motion vector used for the sub-block situated on the same diagonal as the sub-block considered and outside, beneath and to the left of the extended-size block, and the motion vector used for the sub-block situated on the same diagonal as the sub-block considered and outside, on top and to the right of the extended-size block;
    a combination of at least two of the previously listed prediction modes.

6. The method for encoding according to claim 5, wherein said motion prediction mode belongs to the group also comprising at least one of the following prediction modes:
    a mode called a "DC left" mode associating, with all the sub-blocks of the extended-size block, the motion prediction vector representing at least one motion vector used for at least one sub-block situated directly to the left, outside the extended-size block;
    a mode called a "DC top" mode associating, with all the sub-blocks of the extended-size block, the motion prediction vector representing at least one motion vector used for at least one sub-block situated directly on top, outside the first sub-block of the extended-size block.

7. The method for encoding according to claim 6, wherein the following are associated with all the sub-blocks of the extended-size block:
   the motion prediction vector corresponding to the motion vector used for the first sub-block outside the extended-size block directly situated to the left of the first sub-block of the extended-size block, for a mode called "DC left", or
   the motion prediction vector corresponding to the motion vector used for the first sub-block outside the extended-size block directly situated above the first sub-block of the extended-size block for a mode called "DC top".

8. The method for encoding according to claim 6, wherein the following are associated with all the sub-blocks of the extended-size block:
   a combination of the motion prediction vectors corresponding to the motion vectors used for the column of sub-blocks outside the extended-size block situated directly to the left of the extended-size block, for a mode called "DC left", or
   a combination of the motion prediction vectors corresponding to the motion vectors used for the row of sub-blocks outside the extended-size block situated above the extended-size block, for a mode called "DC top".

9. The method for encoding according to claim 1, wherein the method comprises a step of determining a difference, called a residue, between a motion vector of at least one of said sub-blocks and a motion prediction vector associated with that motion vector.

10. The method for encoding according to claim 9, wherein the method implements a technique for grouping the encoding of motion vector residues of the sub-blocks of said extended-size block and implements a signaling belonging to the group comprising signalings of the following type:
   "zerotree" signaling in which the value of each branch representing the residues is close to zero;
   signaling "by range" consisting in encoding series of consecutive residues of a same value.

11. A non-transitory computer-readable memory comprising a computer program stored thereon and comprising instructions for implementing a method of encoding a signal of images, when the program is executed by a processor, said images being sub-divided into sub-blocks of pixels, wherein the method comprises:
   a step of grouping at least three sub-blocks into at least one extended-size block when the sub-blocks meet at least one predetermined grouping criterion; and
   a prediction step applying at least one motion prediction mode using at least two distinct motion prediction vectors for at least one extended-size block, said motion prediction vectors being associated respectively with subsets of said extended-size block, at least one of said subsets comprising at least two of said sub-blocks of said extended-size block being associated to one of said at least two distinct motion prediction vectors, said subsets being predefined and distinct.

12. A device for encoding a signal of images, said images being sub-divided into sub-blocks of pixels, the device comprising:
   means for grouping at least three sub-blocks into at least one extended-size block when said sub-blocks meet at least one predetermined grouping criterion; and
   prediction means for applying at least one motion prediction mode using at least two distinct motion prediction vectors, for at least one extended-size block, said motion prediction vectors being associated respectively with subsets of said extended-size block, at least one of said subsets comprising at least two of said sub-blocks of said extended-size block being associated to one of said at least two distinct motion prediction vectors, said subsets being predefined and distinct.

13. A method for decoding a signal of images, the images being sub-divided into sub-blocks of pixels, the method comprising:
   a step of grouping at least three sub-blocks in at least one extended-size block, when said sub-blocks meet at least one predetermined grouping criterion; and
   a prediction step applying at least one motion prediction mode using at least two distinct motion prediction vectors for at least one extended-size block, said motion prediction vectors being associated respectively with subsets of said extended-size block, at least one of said subsets comprising at least two of said sub-blocks of said extended-size block being associated to one of said at least two distinct motion prediction vectors, said subsets being predefined and distinct.

14. The method for decoding according to claim 13, wherein said prediction step implements a step of decoding a piece of information identifying said selected motion prediction mode, inserted by the encoding into said signal of images.

15. A non-transitory computer-readable memory comprising a computer program stored thereon and comprising instructions to implement a method of decoding a signal of images when said program is executed by a processor, the images being sub-divided into sub-blocks of pixels, wherein the method comprises:
   grouping at least three sub-blocks in at least one extended-size block, when said sub-blocks meet at least one predetermined grouping criterion; and
   a prediction step applying at least one motion prediction mode using at least two distinct motion prediction vectors for at least one extended-size block, said motion prediction vectors being associated respectively with subsets of said extended-size block, at least one of said subsets comprising at least two of said sub-blocks of said extended-size block being associated to one of said at least two distinct motion prediction vectors, said subsets being predefined and distinct.

16. A device for decoding a signal of images, the images being sub-divided into sub-blocks of pixels, the device comprising:
   means for grouping at least three sub-blocks in at least one extended-size block, when said sub-blocks meet at least one predetermined grouping criterion; and
   prediction means for applying at least one motion prediction mode using at least two distinct motion prediction vectors, for at least one extended-size block, said motion prediction vectors being associated respectively with subsets of said extended-size block, at least one of said subsets comprising at least two of said sub-blocks of said extended-size block being associated to one of said at least two distinct motion prediction vectors, said subsets being predefined and distinct.

* * * * *